United States Patent [19]
Lechleider

[11] Patent Number: 5,621,768
[45] Date of Patent: Apr. 15, 1997

[54] GENERALIZED NOISE CANCELLATION IN A COMMUNICATION CHANNEL

[75] Inventor: Joseph W. Lechleider, Morristown, N.J.

[73] Assignee: Bell Communications Research, Inc., Morristown, N.J.

[21] Appl. No.: 346,446

[22] Filed: Nov. 29, 1994

[51] Int. Cl.$^6$ .................................. H04B 1/10; H04L 1/00
[52] U.S. Cl. .......................... 375/346; 375/349; 375/350; 455/303
[58] Field of Search ...................... 375/346, 349, 375/350, 232; 381/94, 71; 367/901; 379/410, 411; 348/607; 455/296, 303, 306, 307

[56] References Cited

U.S. PATENT DOCUMENTS

| | | | |
|---|---|---|---|
| 4,932,063 | 6/1990 | Nakamura | 381/94 |
| 5,465,413 | 11/1995 | Enge et al. | 375/349 |

OTHER PUBLICATIONS

R.G. Gallager, "Information Theory and Reliable Communication", published by John Wiley, 1968.

J.W. Lechleider, "The Optimum Combination of Block Codes and Receivers for Arbitrary Channels", IEEE Trans. Commun., vol. 38, No. 5, May 1990, pp. 615–621.

Widrow et al., "Adaptive Noise Cancelling: Principles and Applications", Proc. IEEE, vol. 63, No. 12, Dec. 1975, pp. 1692–1716.

R.M. Fano, "Transmission of Information", published by John Wiley, 1973.

*Primary Examiner*—Stephen Chin
*Assistant Examiner*—Hai H. Phan
*Attorney, Agent, or Firm*—Joseph Giordano; James W. Falk

[57] ABSTRACT

A generalized noise canceler for canceling noise in a channel having noise composed of correlated noise components. The noise canceler is realized with a finite number of cascade networks, each network being composed of an inner product filter is series with another filter wherein both filters have characteristics determined from a eigenvector equations expressed in terms of the channel operator and noise operator.

10 Claims, 2 Drawing Sheets

GENERALIZED NOISE CANCELLATION IN A COMMUNICATION CHANNEL

FIELD OF THE INVENTION

This invention relates generally to communication systems and, more specifically, to noise cancellation in a channel wherein the correlation of two different components of the noise are utilized to reduce the expected noise power of one of the components.

BACKGROUND OF THE INVENTION

In the book on information theory entitled "Information Theory and Reliable Communication", authored by R. G. Gallager and published by John Wiley, 1968, Gallager shows how the capacity of a time-continuous channel with intersymbol interference and colored noise may be determined. The time-continuous channel of interest is shown in FIG. 1 wherein: channel 100 has impulse response h(t); the input time signal 101 to channel 100 is s(t); one component of the output signal 103 of channel 100 is signal 102 given by $s_o(t)$ (with $s_o(t)$ being the convolution of s(t) and h(t)); and the other component of output signal 103 is additive noise 104 represented by n(t). Both components of output signal 103 are combined in summer 105. As shown in FIG. 2, which includes the frequency domain equivalent of FIG. 1, the first step disclosed by Gallager was that of filtering the channel output 103 with equalizer 201 to flatten the noise spectrum; equalizer 201 has a transfer function given by $[N(\omega)]^{-\frac{1}{2}}$, where $N(\omega)$ is the spectrum of the noise. With reference to FIG. 3, the white noise model equivalent to FIG. 2 is shown wherein: the equivalent channel 301 is the original channel frequency transfer function $H(\omega)$ divided by the square-root of the noise spectrum ($[N(\omega)]^{1/2}$), and the inputs to summer 305 are flat noise component 302 given by $N_o$ and channel output 303. Then Gallager determines the signal shapes that yield the least lost energy in transmission through the equivalent channel of FIG. 3. These optimum input signals form an orthogonal set that is complete in a restricted sense on the space of bounded energy signals at the channel input. Since the optimum input signals are the eigenfunctions of a singular value decomposition of the channel impulse response, the output signals are also orthogonal. Thus, the result of Gallager offered the tractable feature that the complex channel of FIG. 1 could be decomposed into an array of parallel scalar channels as illustrated in FIG. 4.

In FIG. 4, $a_i$ (e.g., 401,402) is the coefficient in the series expansion in the input signals $\{\theta_i(t)\}$ that lose least energy on transmission through the equivalent channel 301:

$$s(t) = \sum_i a_i \theta_i(t) \quad (1)$$

where $\{\theta_i(;)\}$ are normalized to have unit energy. With this input, the channel output, $s_o(;)$, is given by $$s_o(t) = \sum_i a_i \lambda_i^{1/2} \psi_i(t) \quad (2)$$

where $\lambda_i^{1/2}\psi_i(;)$ is the channel output when the channel input is $\theta_i(;)$. The functions $\{\psi_i(;)\}$ are normalized to have unit energy by using the normalization constant $\lambda_i$, which is the channel gain ($\lambda_i$=energy out/energy in) when $\theta_i(;)$ is transmitted. A receiver matched to recover s(;) would equalize $s_o(;)$ to eliminate the $\lambda_i^{1/2}$ factors. This would have the effect of producing noise in the coefficients of the final output (e.g. 407,408 from summers 405 and 406, respectively) that are proportional to $$\left[\frac{N_o}{\lambda_j}\right]^{1/2}$$

(e.g., 403,404) where $N_o$ is the flattened noise power spectral density.

In a separate study as presented in "The optimum combination of block codes and receivers for arbitrary channels," authored by the present inventor J. W. Lechleider and published in the IEEE Trans. Commun., vol. 38, no. 5, May, 1990, pp. 615–621, Lechleider investigates transmission of short sequences of amplitude modulated pulses through a dispersive channel with colored, added noise. Lechleider found that the channel input sequences that led to the maximum ratio of mean output signal power to mean noise power are the solutions to a matrix eigenvalue problem similar to the integral equation eigenvalue problem considered by Gallager. The structure of this channel is much like a finite dimensional version of FIG. 4. Because of the ubiquity of the form of FIG. 4, the idea of signaling so that the transmission model is a set of parallel, uncoupled subchannels with uncorrelated subchannel noises has come to be known as "Structured Channel Signaling," or SCS. Thus, SCS decomposes a complex vector channel into an ordered sequence of scalar sub-channels with uncorrelated sub-channel noise scalars. Because of this lack of correlation, no noise cancellation techniques can be used to further improve the signal-to-noise performance of the total channel. This places an upper bound on what can be achieved by noise cancellation techniques in SCS.

As discussed by Widrow et al. in the paper "Adaptive noise cancelling: Principles and applications," Proc. IEEE, vol. 63, no. 12, pp 1692–1716, December, 1975, auxiliary measurements are made of noise that are correlated with the noise vector that is received with the signal in order to effect noise cancellation. The correlation is used to form a best estimate of the added noise that is subtracted from the received, noise corrupted signal. But, because of the formulation of SCS, SCS obviates any putative noise-cancellation improvement.

As alluded to in the foregoing background, SCS is a modeling technique for dispersive channels that provides insight into channel performance. Moreover, SCS may also be used as a basis for the design of communication systems. By spreading signals over time and frequency, SCS offers some immunity to structured noise such as impulse noise and narrow-band noise. SCS also offers selective use of the best performing sub-channels for the most important subset of information to be transmitted. SCS subsumes generalized noise cancellation, which is a technique for exploiting the correlation of two different components of noise to reduce the expected noise power of one of the components.

The art is devoid of teachings or suggestions, however, of a methodology and concomitant circuitry for generalized noise cancellation in a communication channel having correlated noise components.

SUMMARY OF THE INVENTION

The shortcomings of the prior art with respect to generalized noise cancellation is obviated, in accordance with the present invention, by a noise canceler realized with only a finite number of optimal noise functionals. The canceler and concomitant methodology of generalized noise cancellation utilize an analysis of the formulation and the solution of the SCS regime as the point of departure.

Broadly, in one embodiment, the generalized noise canceler for processing a channel output signal composed of a signal plus noise to produce a filtered channel output signal, the noise being a linear combination of first and second noise components, includes a parallel arrangement of a plurality of cascade networks, each cascade network being responsive to the signal and the noise. Further, each cascade network is composed of an inner product filter circuit having a filter characteristic determined from a first eigenvector equation corresponding to minimization of noise in the first noise component, in series with a second filter having a characteristic determined from a second eigenvector equation related to the first eigenvector equation. All outputs of the second filters are combined to produce a filtered channel output signal.

Broadly, in a second embodiment, a generalized noise canceler for processing a channel output signal composed of a signal plus noise to produce a filtered channel output signal, the noise being a linear combination of first and second noise components, includes a parallel arrangement of a plurality of cascade circuits, each cascade network being responsive to the signal and the noise. Further, each cascade network is composed of a first filter having a filter characteristic determined from a first eigenvector equation corresponding to minimization of the noise in the first noise component, a sampler in series with the first filter, and a second filter having a characteristic determined from a second eigenvector equation related to the first eigenvector equation. All outputs of the second filters are combined to produce a filtered channel output signal.

The organization and operation of this invention will be understood from a consideration of the detailed description of the illustrative embodiments, which follow, when taken in conjunction with the accompanying drawing.

DETAILED DESCRIPTION

The first part of this description presents a derivation of SCS for digital signaling of one-shot channels that is more general than those given previously in the prior art. The derivation is given in a Hilbert space setting that is applicable to a wide range of applications. Then a generalized form of optimum noise cancellation is presented for the same Hilbert space framework. Finally, the development is applied to obtain a methodology and circuitry for noise cancellation.

I.1 STRUCTURED CHANNEL SIGNALING

Figure 1:
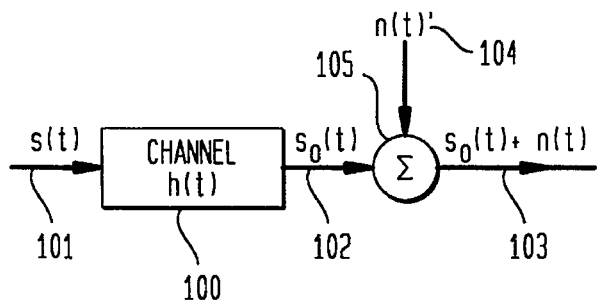
FIG. 1 depicts a prior art time-continuous channel for which optimum signal selection is desired.
Figure 2:
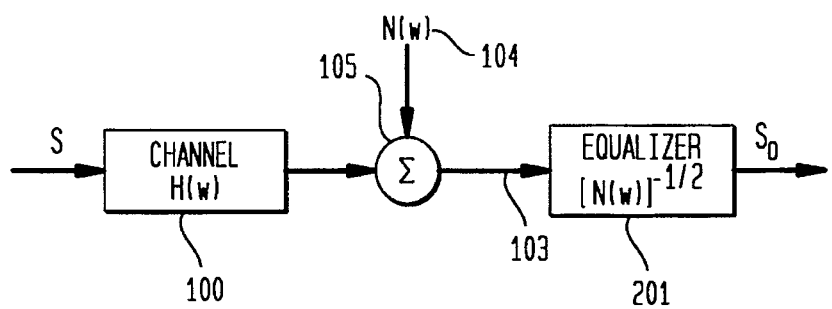
FIG. 2 depicts a filtering arrangement applied to FIG. 1 to flatten the noise spectrum.
Figure 3:
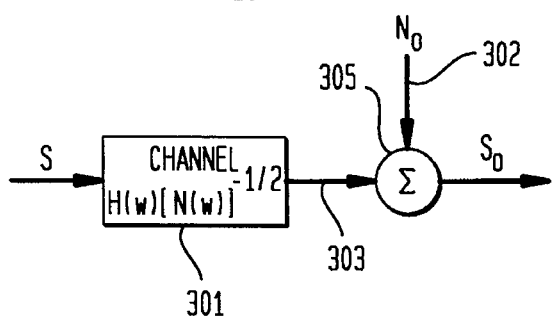
FIG. 3 depicts a flat noise channel which is equivalent to the equalized channel of FIG. 2.
Figure 4:
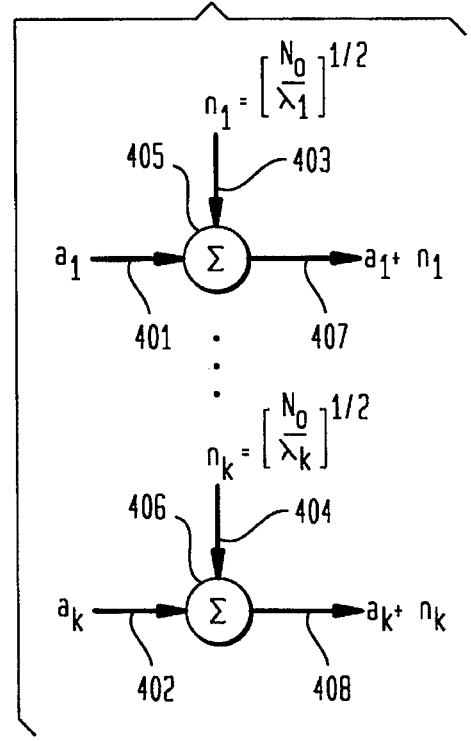
FIG. 4 depicts an equivalent to the channel of FIG. 3 which is implemented as an array of scalar channels.
Figure 5:
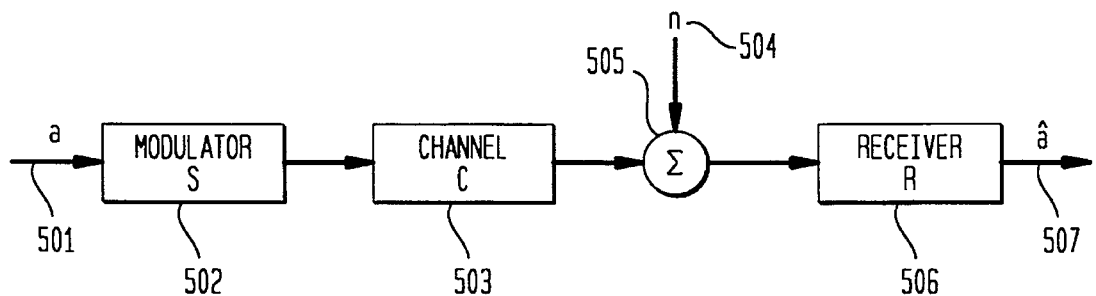
FIG. 5 is one version of a general Hilbert space linear communication channel.

The model of a communications system that is used in this discussion is illustrated in FIG. 5. This model is a generalization of the time continuous model studied by Gallager. The data 501 to be transmitted is a single number, a, that modulates a signal S (502), which is taken to be an element of a Hilbert space. For example, the signal space may consist of all functions of time that are square-integrable on a given segment of the time line. The channel, C (503), is a map from one Hilbert space to another. The space of received signals may, in fact, have a different form for the inner product of two elements than the transmitted signal space does. For example, the transmitted and received signal spaces may have different dimensionalities. It is assumed that there are no input signals that have no output. This is no loss of generality; such signals would not be used in practice. The noise, n (504), is an element of the output space that is selected at random. Only the second order statistics of this noise are used. There may be a subset of the receiver input space that cannot be reached by any transmitted signal. This subspace is referred to as the null output space. The part of n that lies in the null output space may be correlated with the part that lies in its orthogonal complement. This correlation is exploited by the receiver in both SCS and noise cancellation. The receiver 506 is linear, providing an estimate, a (507) of the transmitted signal. This estimate may be written in the form $$\hat{a} = <R, aS_o + n> \quad (3)$$

where the parentheses <> indicate Hilbert space inner product, R is an element of the output signal space, as are $S_o$ and n. The channel operator may be explicitly included in equation (3) to yield $$\hat{a} = (R, aCS+n) = a(R, CS) + (R, n) \quad (4)$$

The mean-square error in this estimate is $$e = <(\hat{a}-a)^2> = <a^2>[(R,CS)-1]^2 + <(R,n)^2>] \quad (5)$$

The received signal power is $$<\hat{a}^2> = <a^2>(R, CS)^2 \quad (6)$$

In SCS the signal, S, and the receiver vector, R, are jointly selected to maximize the signal-to-noise ratio (SNR) at the receiver output, i.e., $$\frac{<\hat{a}^2>}{e} \ .$$

However, this ratio can be made arbitrarily large by using distortionless transmission ((R,CS)=1) and arbitrarily large transmitted power. Thus, it is necessary to constrain the transmitted power to, say, $<a^2>P$ while determining the best combination of S and R. Thus, a modified SNR is considered, namely, $\lambda_\mu$ given by $$\lambda_\mu = \frac{<a^2> (R, CS)^2 + \mu<a^2>[P-(S,S)]}{<a^2> [(R, CS)-1]^2 + <(R, n)^2>} \quad (7)$$

where μ is a parameter similar to a Lagrange parameter; it will be chosen to make the transmitted power equal to $<a^2>P$ so that the second term in the numerator on the right in equation (7) vanishes. In equation (7), parentheses have been used to indicate inner products in the input space.

Now, it is noted that $<(R,n)^2>$ is a symmetric quadratic form in R and, consequently, may be written in the form (R,NR), where N is a symmetric operator. This converts equation (7) to the form $$\lambda_\mu = \frac{<a^2>(R, CS)^2 + \mu<a^2>[P - (S, S)]}{<a^2>[(R, CS) - 1]^2 + (R, NR)^2} \quad (8)$$

Now, consider the combination of S and R that maximizes $\lambda_\mu$ when $\mu$ is chosen so that the the input power is $<a^2>P$. First, keep R fixed and vary S in the sense of the calculus of variations and set the result equal to zero to get a stationary condition. This yields $$[\alpha - \lambda_\mu(\alpha - 1)]CS - \lambda_\mu NR = 0 \quad (9)$$

where $$\alpha = (R, CS) \quad (10)$$

is a measure of the distortion incurred in transmission. Next, hold S fixed in equation (8) and vary R. Then, stationarity requires that $$<a^2>[\alpha - \lambda_\mu(\alpha - 1)]CS - \lambda_\mu NR = 0 \quad (11)$$

Equations (9) and (11) must be satisfied if R and S are optimum receiver-signal pair. Before proceeding with the solution of these equations, $\alpha$ and $\mu$ are now determined. To do this, first take an inner product of equation (11) with R to get, after using equation (10), $$(R, NR) = \frac{<a^2>[\alpha - \lambda_\mu(\alpha - 1)]\alpha}{\lambda_\mu} \quad (12)$$

Now, use equation (12) in equation (7) and assume that the transmitted power constraint is satisfied. The result is $$\lambda_\mu(1 - \alpha) = 0 \quad (13)$$

The only non-trivial solution of this equation is $$\alpha = 1 \quad (14)$$

so that the optimal solution uses distortionless transmission. The value of $\mu$ is now easily determined by using equation (14) in equation (9) and taking the inner product of the result with S to get $$\mu = \frac{1}{P} \quad (15)$$

Equations (14) and (15) permit writing equations (9) and (11) in the form $$PC^T R - S = 0 \quad (16)$$

and $$<a^2>CS - \lambda NR = 0. \quad (17)$$

Using equations (16) in (17) then yields the following eigenvalue problem:

$$P<a^2>CC^T \theta_i = \lambda_i N \theta_i \quad (18)$$

where $\theta_i$ and $\lambda_i$ are the $i^{th}$ eigenvector-eigenvalue pair. If it is assumed that $P<a^2>$, which is the total transmitted power, is unity, $\lambda_i$ becomes the SNR for unit transmitted power and equation (18) becomes $$CC^T \theta_i = \lambda_i N \theta_i. \quad (19)$$

At this point it can be assumed that N is positive definite. However, recall that there might be a subspace of the receiver input space that is inaccessible by transmission through the channel. This implies that $C^T$ may have a null subspace so that there might be eigenvectors of equation (19) that correspond to a zero eigenvalue. The null sub-space of $C^T$ is, of course, spanned by these eigenvectors. The vectors $\{C^T \theta_i\}$ span the range of $C^T$, or, equivalently, the domain of C. Hence, write $$\psi_i = C^T \theta_i \quad (20)$$

so that the $\psi_i$ span the input signal space. Using equation (20) in equation (19) yields $$N^{-1} C \psi_i = \lambda_i \theta_i \quad (21)$$

or, operating on both sides with $C^T$, $$C^T N^{-1} C \psi_i = \lambda_i \psi_i. \quad (22)$$

Thus, the $\{\psi_i\}$ also satisfy an eigenvalue problem. The form of equation (22) is the same as that of the integral equation used by Gallager. Thus, Gallager's eigenfunctions maximize the SNR at the receiver input for constrained transmitted power.

Because of the symmetry of the operators in equation (22), the $\{\psi_i\}$ form a complete orthogonal family on the space of input signals. Equation (22) leads to:

$$(\psi_i, \psi_j) = P \delta_{ij} \quad (23)$$

by standard arguments, where $\delta_{ij}$ a Kronecker delta. Using the definition of the $\{\psi_i\}$ that was given by equation (20) in equation (23) gives an orthogonality principle for the $\{\theta_i\}$, but with a weighting operator:

$$(\theta_i, CC^T \theta_j) = P \delta_{ij}. \quad (24)$$

Using equation (19) in (24) yields another form for this principle:

$$(\theta_i, N \theta_j) = \frac{P}{\lambda_i} \delta_{ij} \quad (25)$$

when $\lambda_i \neq 0$. Recalling the definition of N, equation (25) implies that $$<(\theta_i, n)(\theta_j, n)> = \frac{P}{\lambda_i} \delta_{ij}. \quad (26)$$

Thus, the noise scalar at the output of receiver $\theta_i$ is uncorrelated with the noise at the output of receiver $\theta_j$. It is important to note that equation (23) says nothing about the component of the noise vector that lies in the orthogonal complement of the space spanned by the $\{\theta_i\}$ with non-zero $\lambda_i$.

An orthogonality principle for the channel outputs corresponding the optimal channel inputs can also be derived. To do this, take the inner product of both sides equation (22) with $\psi_j$ to get $$(C\psi_j, N^{-1}C\psi_i) = \lambda_i P \delta_{ij} \quad (27)$$

where equation (23) has been used.

The most important orthogonality principle resulting from the eigenvalue problem is that the optimum channel output signal set $\{C\psi_i\}$, is biorthogonal in the optimum receiver vector set $\{\theta_i\}$. This principle implies that the separate sub-channels formed by the $\{\theta_i, \psi_i\}$ pairs are not coupled to each other. To arrive at this bi-orthogonality, recognize that equation (24) may be written in the form $$(\theta_i, C\psi_j) = P \delta_{ij} \quad (28)$$

by employing equation (20). Equation (28) says that separate information may be sent on each of the sub-channels without any interference between them. When this is combined with uncorrelated sub-channel noise, a complex channel with colored noise can be used as separate, unrelated subchannels.

I.1.1 CHANNEL CAPACITY

This section uses the SCS model to determine the capacity of the channel under the assumption of Gaussian noise. Then the individual scalar sub-channels of the SCS model have Gaussian noise. Since the capacity of any scalar channel is bounded below by the channel that has Gaussian noise with the same mean-square value as noise that is actually present (e.g. see the text entitled "Transmission of Information" by R. M. Fano, John Wiley, 1973), a lower bound on the capacity of the channel is obtained by making the Gaussian assumption.

It is shown that the channel capacity is achieved when only a finite number of the optimal transmitted $\{\phi_n\}$ are employed in modulating data, so that the optimal transmitted signal space is finite-dimensional. Thus, in a very broad class of communications channels are, effectively, finite-dimensional channels. This simplifies filtering and signal processing generally. This detailed description shows how to implement this optimal and simplest form of signal processing.

With the assumption of Gaussian noise for the sub-channel, the sub-channel capacity for the $m^{th}$ channel may be written in the form $$C_m = 0.5 \log \left[ 1 + \frac{A_m^2}{\sigma_m^2} \right] \quad (1)$$

where, from equation (I.1.26), the noise on the $m^{th}$ sub-channel is $$\sigma^2{}_m = \langle (\theta_m, n)^2 \rangle \quad (2)$$

and where the information power has been written in the form $A^2_m$ for convenience.

Since the noise components on different sub-channels are uncorrelated, the capacity of the overall channel, C, can be written as the sum of the capacities of the individual sub-channels:

$$C = 0.5 \sum_m C_m = 0.5 \sum_m \log \left[ 1 + \frac{A_m^2}{\sigma_m^2} \right]. \quad (3)$$

To maximize the capacity of the channel, the power on each of the subchannels, $A^2_m$, must be chosen appropriately. Of course, the sum of the sub-channel powers must be constrained during the optimization. To optimize, first assume that there are only a finite number of sub-channels that are used, say M. Then write (3) in the form $$C = 0.5 \sum_{m=1}^{M} \log(A_m^2 + \sigma_m^2) - 0.5 \sum_{m=1}^{M} \log \sigma_m^2. \quad (4)$$

The values of the $A^2_m$'s cannot effect the second sum on the right in equation (4), so the $A^2_m$'s should be chosen to maximize the first summation in order to maximize the channel capacity. By the Schwartz inequality, the first summation is maximized if all of the logarithms are equal. This can only be achieved if $$A^2_m + \sigma^2_m = k, \quad (5)$$

where k is some constant. To determine k, sum both sides of equation (5) over m to get $$\sum_{m=1}^{M} A_m^2 + \sum_{m=1}^{M} \sigma_m^2 = Mk. \quad (6)$$

If the transmitted power is constrained to be $A^2$, i.e., $$A^2 = \sum_{m=1}^{M} A_m^2 \quad (7)$$

in equation (6), the following obtains:

$$k = \frac{A^2 + \sum_{m=1}^{M} \sigma_m^2}{M}. \quad (8)$$

With this, obviously positive, value for k, equation (5) yields $$A_m^2 = \frac{A^2 + \sum_{m=1}^{M} \sigma_m^2}{M} - \sigma_m^2. \quad (9)$$

In particular, this equation must be true for $m = M$, so that $$A_M^2 = \frac{A^2 + \sum_{m=1}^{M} \sigma_m^2}{M} - \sigma_M^2 = \frac{A^2 + \sum_{m=1}^{M} \sigma_m^2 - M\sigma_M^2}{M}. \quad (10)$$

From equation (I.1.26) it is known that the mean square noise on the subchannels is inversely proportional to the eigenvalues of a strictly positive definite compact operator. These eigenvalues can be arranged in descending order in a sequence that has zero as a limit point even though zero is not an eigenvalue, because of the properties of compact operators. Thus, the sequence $\{\sigma^2_m\}$ is a non-decreasing, unbounded sequence. Consequently, the sequence $$\left( \sum_{m=1}^{M} \sigma_m^2 - M\sigma_M^2 \right)$$

is a monotonically non-increasing unbounded sequence. As a result, for all M exceeding some minimal value, $$M\sigma_M^2 - \sum_{m=1}^{M} \sigma_m^2 > A^2, \quad (11)$$

so that equation (10) dictates that $A^2_M$ should be negative for all M exceeding the minimum value, which cannot follow. Consequently, the sequence $\{A^2_m\}$ of optimal transmitted signal powers on the SCS sub-channels must terminate at the largest M for which $$M\sigma_m^2 - \sum_{m=1}^{M} \sigma_m^2 < A^2, \quad (12)$$

and the capacity of the channel is then given by equation (4).

I.2 NOISE CANCELLATION

This section generalizes the noise cancellation theory advanced by Widrow, et al., in the article entitled "Adaptive noise canceling: Principles and application," as published in Proc. IEEE, vol. 63, no. 12 pp. 1692–1716, December, 1975, to a Hilbert space setting. The essential idea in noise cancellation is that the space that a noise vector lies in may be divided into two orthogonal subspaces and the correlation of the components of the noise in these subspaces can be exploited to reduce the magnitude of the noise in one of the subspaces. This is tantamount to decorrelating the components of the noise in the two subspaces.

Suppose that a (random) noise vector, n, lies in a Hilbert space, H, that is comprised of two orthogonal subspaces, $H_1$ and $H_2$. The noise is thus a linear combination of components in each subspace:

$$n = n_1 + n_2 = P_1 n + P_2 n, \quad (1)$$

where $P_k$ is the orthogonal projection of H onto $H_k$, i.e., $$P_k H = H_k, \quad (2)$$

and $$P_j P_k = P_k \delta_{ij}. \quad (3)$$

The correlation of the components of the noise in the two subspaces is expressed by covariance operators that are defined by $$\langle (P_k n, P_j n) \rangle = TR[\langle P_j n (P_k n)^T \rangle] = TR[P_j \langle n n^T \rangle P_k] = TR N_{jk} \quad (4)$$

where TR indicates the trace and $$N_{jk} = P_j N P_k \quad (5)$$

is the covariance operator for the noise components in the subspaces. Now, suppose that it is desired to minimize the noise in H by exploiting the correlation between $n_1$ and $n_2$. To do that, form a linear combination of $n_1$ and a vector (called $Ln_2$) in $H_1$ that is linearly related to $n_2$. Thus, form a new vector $n_0$ in $H_1$ of the form $$n_0 = n_1 + L n_2 \quad (6)$$

where L is a linear operator with domain $H_2$ and range $H_1$, i. e., $$L = P_1 L P_2. \quad (7)$$

Of course, L should be chosen to minimize the mean-square value of $n_0$:

$$\langle (n_0, n_0) \rangle = TR[n_0 n_0^T] = TR[(n_1 + L n_2)(n_1 + L n_2)^T]. \quad (8)$$

By a standard variational procedure, the optimum operator, call it $L_0$, is given by $$L_0 = -N_{12} N_{22}^{-1} = -P_1 N_{12} N_{22}^{-1} P_2. \quad (9)$$

A filter, F, that operates on n and produces the minimal noise ($n_0$) in $H_1$ is given by $$F = P_1 + L_0 = P_1 (I - N_{12} N_{22}^{-1} P_2). \quad (10)$$

To see that $n_0$ and $n_2$ are uncorrelated, use $n_0 = Fn$ and then, $$\langle (n_0, n_2) \rangle = \langle TR[n_0^T n_2] = TR[\langle n_2 n_0^T \rangle]. \quad (11)$$

But, $$TR[\langle n_2 n_0^T \rangle] = TR[\langle n_2 n^T (P_1 - N_{22}^{-1} N_{21}) \rangle] = TR[N_{21} - N_{21}] = 0. \quad (12)$$

I.3 NOISE CANCELLATION IN STRUCTURED CHANNEL SIGNALING

This section demonstrates that SCS incorporates optimum noise cancellation as described in the preceding section. In fact, noise cancellation is a limiting case of SCS. The starting point is the observation that the space of channel outputs is a (possibly) proper subspace of the receiver input space. First, a formula is developed for the operator that projects the receiver input space onto the channel output space. To do this, first write the channel outputs in the form $$S_0 = CS \quad (1)$$

where $S_0$ is a generic channel output that is caused by input signal S. To develop the projection, first operate on both sides of (1) with $C^T$ to obtain $$C^T S_0 = C^T CS. \quad (2)$$

Since C does not annihilate any channel inputs, $C^T C$ is positive-definite and consequently may be inverted in equation (2) to obtain $$(C^T C)^{-1} C^T S_0 = S. \quad (3)$$

Now, operate on both sides of equation (3) with C to obtain $$C(C^T C)^{-1} C^T S_0 = S_0. \quad (4)$$

Since equation (4) is true for all channel outputs, the operator on the left must be an identity operator on the space of channel outputs. Since the domain of $C^T$ is the receiver input space, it follows that the operator $$P_1 = C(C^T C)^{-1} C^T \quad (5)$$

projects the receiver input space onto the channel output space, which is now designated by $H_1$. That $P_1$ is an orthogonal projection follows directly from the fact that it is obviously symmetric and idempotent.

Equation (5) tells how to construct the operator that projects any receiver input onto the space of channel outputs, which is called $H_1$, from a knowledge of the channel characteristics. To see what the implications of this construction are, consider equation (I.1.19) for the optimum receiver vectors. The receiver eigenvectors, including those for $\lambda_i = 0$, span the receiver input space, of which $H_1$ is a proper subspace. The eigenvectors corresponding to $\lambda_i = 0$ lie in the orthogonal complement to $H_1$, which will be called $H_2$. To see this, generically index with a zero all eigenvectors and eigenvalues corresponding to a zero eigenvalue. Then, equation (I.1.19) becomes, for eigenvectors corresponding to zero eigenvalue, $$CC^T\theta_0 = 0. \tag{6}$$

Operate on both sides of equation (6) with $C(C^TC)^{-2}C^T$ to obtain $$P_1\theta_0 = 0. \tag{7}$$

Thus, those $\theta_i$ that correspond to zero eigenvalues lie completely in $H_2$. For the non-zero $\lambda_i$, operate on both sides of equation (I.1.19) with $P_1$ to obtain $$CC^T\theta_i = \lambda_i P_1 N \theta_i. \tag{8}$$

Comparison of equations (8) and (I.1.19) now yields $$P_1 N \theta_i = N \theta_i, \tag{9}$$

which equation implies, on comparison with (I.1.19), $$P_2 N \theta_i = 0, \tag{10}$$

where another orthogonal projection has been defined by $$P_2 = I - P_1, \tag{11}$$

where I is the identity operator on the receiver input space and $P_2$ is projection onto $H_2$. Use equation (11) to express $\theta_1$ in equation (10), with the results $$P_2 N(P_1\theta_i) + P_2 N(P_2\theta_i) = 0 \tag{12}$$

or, $$N_{21} P_1 \theta_i = -N_{22} P_2 \theta_i, \tag{13}$$

so that $$P_2\theta_i = -N_{22}^{-1} N_{21} P_1 \theta_i. \tag{14}$$

Thus, if a noise vector, n, is passed through a matched filter, $\theta_i$, the sampled output of the filter is $$(\theta_i, n) = (P_1\theta_i, n) + (P_2\theta_i, n). \tag{15}$$

Employ equation (14) in the second term on the right in equation (15) with the results $$(\theta_i, n) + (P_1\theta_i - N_{22}^{-1} N_{21} P_1 \theta_i, n) = (F^T P_1 \theta_i, n) = (P_1\theta_i, Fn) = (\theta_i, FN) \tag{16}$$

where F is given by equation (I.2.10) and the definition of the adjoint of an operator has been used. This equation is similar to the optimum noise filter of section (I.2), but only one of the eigenvectors is involved. Now, recall from sections (I.1) and (I.1.1) that the optimum linear receiver that achieves the maximum capacity for a channel is of the general form $$R = \sum_{k=1}^{M} \psi_k \theta_k^T. \tag{18}$$

That is, for any signal x in the receiver's input space, the receiver's output, $s_x$, which lies in the channel's input space, is of the general form $$s_x = Rx = \sum_{k=1}^{M} \psi_k(\theta_k, x). \tag{18}$$

Using equation (16) in equation (18) yields $$s_x = \sum_{k=1}^{M} \psi_k(P_1\theta_k, Fx) \tag{19}$$

so that the optimum SCS receiver is comprised of the optimum noise cancellation filter, F, followed by a bank of matched filters with sampled outputs that drive filters that have responses equal to the optimal basis vectors of the input space.

It should now be noted that as the channel operator approaches the characteristics of a projection operator, i.e., as $C \to P_1$, as it might through equalization, that the channel outputs approach the channel inputs from equation (I.1.20), i.e., $P_1\theta_i \to \psi_i$. Consequently, as $C \to P_1$, equation (19) becomes $$s_x = \sum_{k=1}^{M} \psi_k \psi_k^T Fx = P_1 Fx, \tag{20}$$

so that the optimum SCS receiver becomes an optimum noise canceler. Thus, an optimum noise canceler has been determined in the form of a finite bank of matched filters with sampled outputs that drive filters with responses that are the optimal SCS input basis signals.

Figure 6:
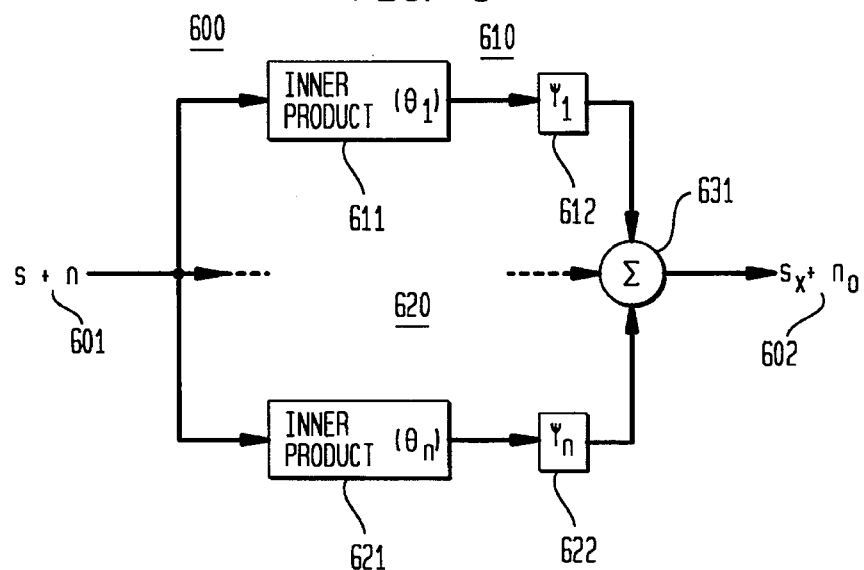
FIG. 6 is an illustrative embodiment of a generalized Hilbert space noise canceler.

A circuit implementation of a generalized noise canceler 600 in accordance with equation (18) is shown in FIG. 6 wherein the signal plus noise (s and n—reference numeral (601)) serve as the input to a parallel arrangement of M cascade networks 610, ..., 620. Each cascade network (e.g., cascade 610) is similarly arranged and includes an inner product filter circuit (e.g. element 611) determined in correspondence to a given $\theta_k$ (e.g., $\theta_1$) in series with a filter (e.g. element 612) having a filter characteristic determined from a corresponding $\psi_K$ (e.g., $\psi_1$). The outputs of the cascade networks 610, ..., 620 are summed in summer 631 to produce output signal $s_x$ plus $n_0$ (reference numeral 602). The $\theta_k$'s and $\psi_k$'s are determined from the solution of the eigenvalue relation set forth in equations I1.21 and I.1.22, respectively, given the channel operator C and the noise operator N. An inner product is defined for the given Hilbert space; generally for realizable circuits the output of each inner product circuit (e.g., element 611) is a scalar value generated periodically. Each scalar value serves as the input signal to the corresponding filter having an impulse response given by the $\psi_k$'s.

Figure 7:
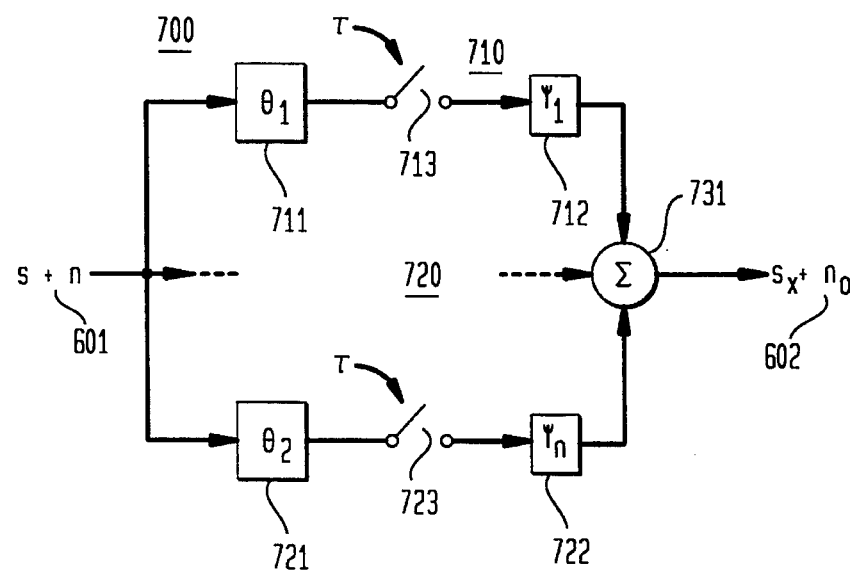
FIG. 7 is an illustrative embodiment of the generalized Hilbert space noise canceler of FIG. 6 depicting one realization of the inner product filter of FIG. 6.

To illustrate one embodiment of an inner product circuit depicted FIG. 6, reference is now made to FIG. 7 wherein, for example, inner product circuit 611 of FIG. 6 is composed of filter 711, having an impulse response given by $\theta_1$, followed by a sampler 713 sampling every $\tau$ seconds. In the specific embodiment of FIG. 7, noise canceler 700 is composed of a plurality of cascade networks 710, ..., 720 for which cascade network 710 is exemplary; network 710 includes: matched filter 711 having an impulse response given by $\theta_1$; sampler 713 sampling every $\tau$ seconds to produce a sampled output value; and matched filter 712 having an impulse response given by $\psi_1$ for processing the sampled output value.

It should be noted that the number of cascade networks in either FIG. 6 or FIG. 7 is finite even if the channel is capable of transmitting signals from an infinite dimensional space. When the channel is a projector this is an important result. It says that the optimum noise canceler will select a finite dimensional subspace of the projector range that is the best subspace for the representation of information in the given noise environment. The subspace is best in the sense that it permits the representation of the maximal amount of information in a signal in the sense of information theory. The optimal noise canceler thus not only cancels noise, it also chooses the optimum subspace, including the dimensionality of the subspace, for the representation of information.

Although the foregoing detailed description has focused on time-invariant channels, it is also within the contemplation of one of ordinary skill in the art that the foregoing development may be readily modified to encompass time-varying channels. In addition, rather than just treating time-domain signal spaces, one of ordinary skill in the art may readily contemplate adapting the theoretical development to further encompass spatial signal spaces.

It is to be understood that the above-described embodiments are simply illustrative of the principles in accordance with the present invention. Other embodiments may be readily devised by those skilled in the art which may embody the principles in spirit and scope. Thus, it is to be further understood that the circuit arrangements described herein are not limited to the specific forms shown by way of illustration, but may assume other embodiments limited only by the scope of the appended claims.

What is claimed is:

1. A noise canceler for processing a channel output signal composed of a signal plus noise to produce a filtered channel output signal, the noise being a linear combination of first and second noise components, the canceler comprising a parallel arrangement of a plurality of cascade networks, each cascade network being responsive to the signal and the noise to produce an output signal, wherein each cascade network includes: an inner product filter circuit having a filter characteristic determined from a first eigenvector equation corresponding to minimization of noise in the first noise component, in series with a second filter having a characteristic determined from a second eigenvector equation related to the first eigenvector equation, and means for combining the outputs of the second filters to produce the filtered channel output signal.

2. The noise canceler as recited in claim 1 wherein the channel is expressed by a channel operator C and the noise is expressed by a noise operator N, and wherein the first eigenvector equation is given by $N^{-1} C \psi_i = \lambda_1 \theta_i$ and the second eigenvector equation is given by $C^T N^{-1} C \psi_i = \lambda_1 \psi_i$, where $\psi_i$ is an eigenvector representing the transmitted signal shape, $\lambda_1$ is an eigenvalue representing the signal-to-noise ratio, and $\theta_i$ is a vector set representing the filter characteristic.

3. A noise canceler for processing a channel output signal composed of a signal plus noise to produce a filtered channel output signal, the noise being a linear combination of first and second noise components, the canceler comprising a parallel arrangement of a plurality of cascade networks, each cascade network being responsive to the signal and the noise and including: a first filter having a filter characteristic determined from a first eigenvector equation corresponding to minimization of the noise in the first noise component; a sampler responsive to the first filter; and a second filter, coupled to the sampler, the second filter having a characteristic determined from a second eigenvector equation related to the first eigenvector equation, and means for combining the outputs of the second filters to produce the filtered channel output signal.

4. The noise canceler as recited in claim 3 wherein the channel is expressed by a channel operator C and the noise is expressed by a noise operator N, and wherein the first eigenvector equation is given by $N^{-1} C \psi_i = \lambda_1 \theta_i$ and the second eigenvector equation is given by $C^T N^{-1} C \psi_i = \lambda_1 \psi_i$, where $\psi_i$ is an eigenvector representing the transmitted signal shape, $\lambda_1$ is an eigenvalue representing the signal-to-noise ratio, and $\theta_i$ is a vector set representing the filter characteristic.

5. The noise canceler recited in claim 4 wherein the first filter in the $k^{th}$ cascade network has an impulse response given by $\theta_k$, and the second filter in the $k^{th}$ cascade network has an impulse response given by $\psi_k$.

6. A method for canceling noise in a channel output signal composed of a signal plus noise to produce a filtered channel output signal, the noise being a linear combination of first and second noise components, the method comprising the steps of processing the signal plus noise with a plurality of cascade networks, each cascade network being responsive to the signal and the noise, wherein the processing in each cascade network includes the steps of:

processing the signal and the noise with an inner product filter circuit having a filter characteristic determined from a first eigenvector equation corresponding to minimization of noise in the first noise component, and processing the output of the inner product filter with a second filter having a characteristic determined from a second eigenvector equation related to the first eigenvector equation, and combining the outputs of the second filters to produce the filtered channel output signal.

7. The method as recited in claim 6 wherein the channel is expressed by a channel operator C and the noise is expressed by a noise operator N, and wherein the first eigenvector equation is given by $N^{-1} C \psi_i = \lambda_1 \theta_i$ and the second eigenvector equation is given by $C^T N^{-1} C \psi_i = \lambda_1 \psi_i$, where $\psi_i$ is an eigenvector representing the transmitted signal shape, $\lambda_1$ is an eigenvalue representing the signal-to-noise ratio, and $\theta_i$ is a vector set representing the filter characteristic.

8. A method for canceling noise in a channel output signal composed of a signal plus noise to produce a filtered channel output signal, the noise being a linear combination of first and second noise components, the method comprising the steps of processing the signal plus noise with a plurality of cascade networks, each cascade network being responsive to the signal and the noise, wherein the processing in each cascade network includes the steps of:

processing the signal and the noise with a first filter circuit having a filter characteristic determined from a first eigenvector equation corresponding to minimization of noise in the first noise component, sampling the output of the first filter at a predetermined rate to produce a sampled value, and processing the sampled value with a second filter having a characteristic determined from a second eigenvector equation related to the first eigenvector equation, and combining the outputs of the second filters to produce the filtered channel output signal.

9. The method as recited in claim 8 wherein the channel is expressed by a channel operator C and the noise is expressed by a noise operator N, and wherein the first eigenvector equation is given by $N^{-1} C\psi_i=\lambda_i\theta_i$ and the second eigenvector equation is given by $C^T N^{-1} C\psi_i=\lambda_i\psi_i$, where $\psi_i$ is an eigenvector representing the transmitted signal shape, $\lambda_I$ is an eigenvalue representing the signal-to-noise ratio, and $\theta_i$ is a vector set representing the filter characteristic.

10. The method as recited in claim 9 wherein the first filter in the $k^{th}$ cascade network has an impulse response given by $\theta_k$, and the second filter in the $k^{th}$ cascade network has an impulse response given by $\psi_k$.

* * * * *